B. PATTERSON.
CARRYING DEVICE FOR RECEPTACLES.
APPLICATION FILED JULY 13, 1916.
1,269,738.
Patented June 18, 1918.
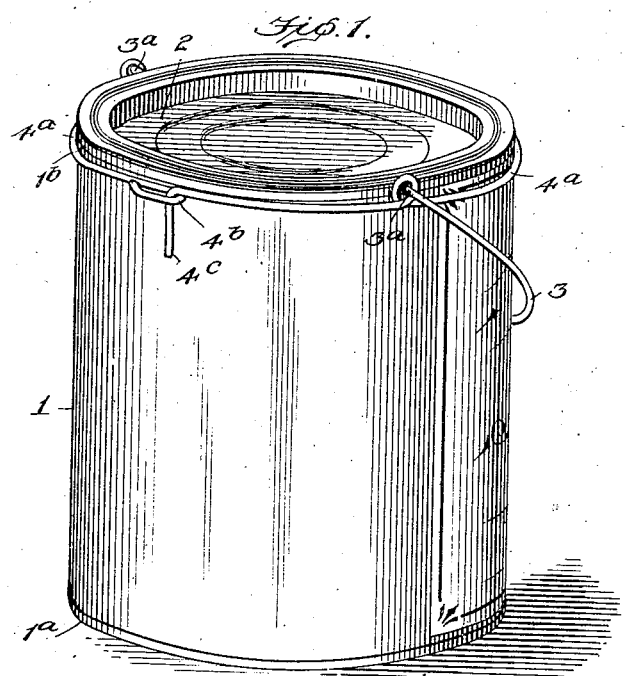
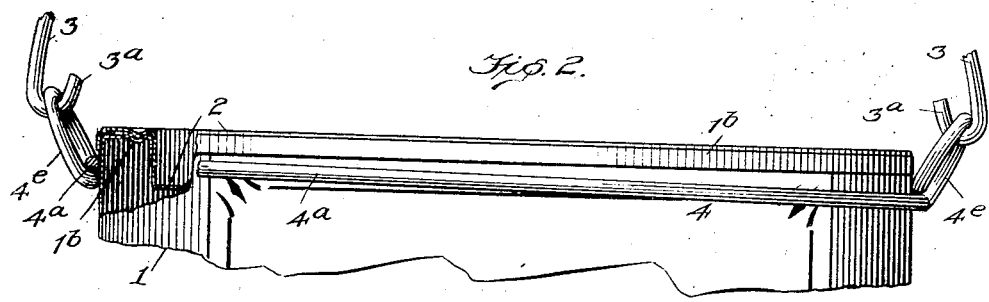
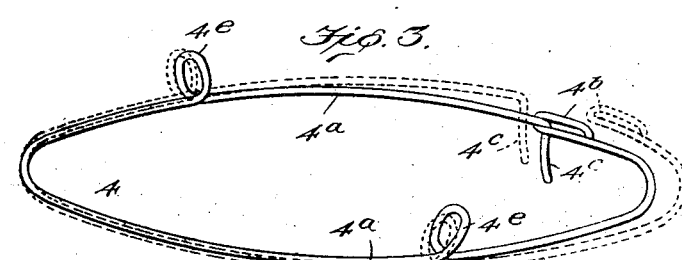
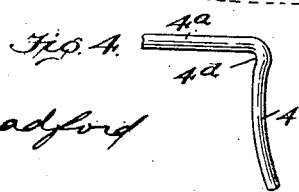
Witness
Edwin L. Bradford
Inventor
Ben Patterson
By
Edward R. Alexander
Attorney

UNITED STATES PATENT OFFICE.

BEN PATTERSON, OF CLEVELAND, OHIO, ASSIGNOR TO THE PATTERSON-SARGENT COMPANY, OF CLEVELAND, OHIO, A CORPORATION OF OHIO.

CARRYING DEVICE FOR RECEPTACLES.

1,269,738.　　　　　Specification of Letters Patent.　　Patented June 18, 1918.

Application filed July 13, 1916. Serial No. 109,018.

*To all whom it may concern:*

Be it known that I, BEN PATTERSON, a citizen of the United States, residing at Cleveland, in the county of Cuyahoga and State of Ohio, have invented certain new and useful improvements in and relating to Carrying Devices for Receptacles, of which the following is a specification.

This invention relates to carrying devices for receptacles.

One object of the invention is to provide a novel attaching device adapted to connect a bail to a receptacle of any desired shape and construction.

Another object of the invention is to provide an improved construction of bail attaching device formed from a single length or section of wire and adapted to be tightly bound to the receptacle so as to secure the bail thereto in a secure manner without damaging the receptacle.

With these and other objects in view the invention consists of the part or parts, or combination of parts or their equivalents hereinafter described and set forth in the claim.

For the purpose of illustration, I have, in the accompanying drawings, shown and herein described one form of apparatus embodying my invention.

Figure 1 is a perspective view of a receptacle and a bail attaching device, embodying my invention, applied thereto for securing a bail to the receptacle.

Fig. 2 is a fragmentary side elevation of the can, bail and bail attaching device.

Fig. 3 is an enlarged view of the bail attaching device.

Fig. 4 is a detail view.

In the drawings, 1 indicates a receptacle of any desired shape and construction. The receptacle may be formed of any suitable material. The receptacle chosen for illustrative purposes is formed from tin and is of cylindrical shape, it preferably having the same diameter from end to end. The receptacle or can 1 has a bottom $1^a$ which is preferably soldered to the lower end of the can body. $1^b$ indicates a ring preferably soldered to the upper end of the can body. The ring $1^b$ is formed with a suitable seat to receive a cover 2. The cover 2 is preferably constructed with a depending portion the periphery of which tightly fits within and against the inner wall of the ring to form a sealed, substantially liquid tight closure for the can.

3 indicates the bail for the can. The bail may be of any desired shape, but is preferably formed from wire. The opposite ends of the bail may be bent into hooks $3^a$ for pivotal connection with the bail attaching device 4, as hereinafter set forth.

The attaching device 4 is preferably formed from a section of resilient wire bent into a ring $4^a$ corresponding in size to the can 1 to which it is to be applied. At one end the wire $4^a$ is bent back on itself preferably in the plane of the ring to form an eye or loop $4^b$; at its opposite end, the wire is bent at substantially right angles, preferably downwardly, to form a hook, as shown at $4^c$. The section $4^c$ is adapted to be inserted in the eye or loop $4^b$ to connect the ends of the wire ring together. The hook $4^c$ is preferably curved slightly laterally to form a cam which by engagement with the loop $4^b$, as the hook is pushed therethrough, serves to draw the ends of the wire ring together and in binding engagement with the can body 1. $4^e$ indicates one or more coiled loops formed in the wire ring $4^a$ intermediate its ends. When two loops $4^e$ are provided, they are preferably arranged diametrically opposite each other and serve as the connecting devices for the hooks $3^a$ of the bail 3. The ring $4^a$ being formed from resilient wire, the loops $4^e$ yield under tension on the ring $4^a$ in the direction of its length, as the cam portion of the hook $4^c$ is inserted through the eye $4^b$, while the hook may be flexed slightly during its positioning to avoid damaging the can body. At the point of connection of the hook $4^c$ with the ring, the wire is slightly off-set, to form a seat, as shown at $4^d$, for the loop $4^b$; this seat prevents the hook $4^c$ from readily sliding out of the loop $4^b$.

My invention is particularly adapted for tin cans of cylindrical shape from end to end and devoid of flanges, shoulders, bent-over parts or members around their upper ends. With this end in view I have sought to provide a bail attaching device which in a secure and positive manner detachably engages the outer wall of the can without damaging it.

My attaching device is rigidly held in engagement with the can so that it can be easily carried by the bail 3.

It will thus be seen that in the use of my invention, it is not necessary to provide on the can a flange or shoulder with which the attaching device must engage nor to make the sides of the can body tapering.

The attaching device 4 may be bent into substantially ring shape in any suitable manner. It is preferably so bent that the opposite ends of the wire ring 4ª are slightly separated from each other (see dotted lines in Fig. 3), to permit ready positioning of the device over the upper end of the can 2. The device 4 is formed of a size to fit tightly around the can body, when its opposite ends are brought together and the hook 4ᶜ is passed through the loop 4ᵇ, such operation serving to bind all portions of the wire ring 4ª into intimate and rigid engagement with the side walls of the can 2 with the resilient loops 4ᶜ under tension.

While my invention may be used to secure bails to receptacles and cans of varying shapes, including tapering shapes, as well as receptacles having annular flanges or shoulders, it is particularly adapted to secure bails to cylindrical shaped receptacles or cans which are without flanges or shoulders at their tops, such as illustrated in the drawings. One useful application of the invention is its use upon cans which bear labels. Heretofore all cans or receptacles, which were provided with bails, had to be labeled by hand, such operation necessitating much labor and time. By the use of my invention the cans can be automatically labeled, prior to the application of the attaching device 4, by rolling the cans over a surface in which are supported the labels to be pasted to the can, this being one well known form of apparatus for automatically and rapidly labeling cylindrical cans. By the use of my invention the cans can first be labeled in this manner and thereafter the bail attaching devices applied as already set forth.

To those skilled in the art many modifications of and widely differing embodiments and applications of my invention will suggest themselves, without departing from the spirit and scope thereof. My disclosures and the descriptions herein are purely illustrative and are not intended to be in any sense limiting.

What I claim is:

A carrying device for a receptacle comprising a section of wire bent into substantially ring-shape for clamping engagement with the outer wall of the receptacle and provided intermediate its ends with a coiled resilient tension loop adapted to yield under tension on the wire in the direction of its length, one end of said wire section being bent to form an eye and its opposite end being bent downwardly and laterally curved to form a cam-shaped hook for insertion in and engagement with said eye, the cam of said hook when the latter is inserted in said eye serving to draw said wire section into clamping engagement with the outer wall of the receptacle, and said loop permitting said wire section to yield during insertion of said hook, and a bail connected to said wire section at one end and at its opposite end connected to said loop.

In testimony whereof I affix my signature, in the presence of two witnesses.

BEN PATTERSON.

Witnesses:
W. T. DAVIES,
P. R. KITTINGER.

Copies of this patent may be obtained for five cents each, by addressing the "Commissioner of Patents. Washington, D. C."